(12) United States Patent
Kolomeitsev et al.

(10) Patent No.: US 7,161,819 B2
(45) Date of Patent: Jan. 9, 2007

(54) ZERO-CROSSING CORRECTION IN SINUSOIDALLY COMMUTATED MOTORS

(75) Inventors: Sergei Kolomeitsev, Rochester Hills, MI (US); Joseph P. Whinnery, Pontiac, MI (US); Thomas Gallagher, Lake Orion, MI (US); Hong Jiang, Rochester Hills, MI (US); John Suriano, Auburn Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 336 days.

(21) Appl. No.: 10/896,665

(22) Filed: Jul. 22, 2004

(65) Prior Publication Data
US 2006/0018139 A1    Jan. 26, 2006

(51) Int. Cl.
H02M 7/5387    (2006.01)
H02M 3/24    (2006.01)
G05B 11/28    (2006.01)
G05F 1/00    (2006.01)

(52) U.S. Cl. .................. 363/132; 363/98; 318/599

(58) Field of Classification Search ............. 363/16, 363/17, 56.01, 56.02, 97, 98, 131, 132; 318/599, 318/604, 800–802, 806, 812, 814, 254
See application file for complete search history.

(56) References Cited

U.S. PATENT DOCUMENTS

| | | | |
|---|---|---|---|
| 3,924,167 A | 12/1975 | Clark et al. | |
| 5,428,522 A * | 6/1995 | Millner et al. | 363/63 |
| 5,442,540 A * | 8/1995 | Hua et al. | 363/98 |
| 5,764,024 A | 6/1998 | Wilson | |
| 5,808,441 A | 9/1998 | Nehring | |
| 5,946,200 A * | 8/1999 | Kim et al. | 363/17 |
| 5,977,741 A | 11/1999 | DeLange et al. | |
| 6,420,685 B1 | 7/2002 | Tanamachi | |
| 6,483,724 B1 * | 11/2002 | Blair et al. | 363/17 |
| 6,504,427 B1 | 1/2003 | Midya et al. | |
| 6,580,236 B1 | 6/2003 | Mitsuda | |
| 6,992,902 B1 * | 1/2006 | Jang et al. | 363/17 |

OTHER PUBLICATIONS

Motorola, Inc., Motorola Semiconductor Application Notes; AN1728; 1997.

* cited by examiner

*Primary Examiner*—Matthew V. Nguyen
(74) *Attorney, Agent, or Firm*—Young Basile

(57) ABSTRACT

An apparatus and method for controlling sinusoidal currents in inductive loads during zero-crossing to reduce distortion. The apparatus and method utilizes first and second PWM signals during a single PWM cycle to apply opposite voltage signals to obtain a net desired voltage across the inductive load. The voltage applied to the load is compared with a threshold and, when the applied voltage is greater than the threshold, normal PWM signals are applied to the load, and when the applied voltage is less than the threshold, an adjusted voltage formed of first and second PWM signals is applied to the load.

12 Claims, 6 Drawing Sheets

ZERO-CROSSING CORRECTION IN SINUSOIDALLY COMMUTATED MOTORS

BACKGROUND

Typically certain motors require a sinusoidal current to be applied for smooth torque production. However, the power electronics that are used to generate the sinusoidal currents do not function well when the current magnitude is small.

A controller, such as a microcontroller containing a central processor, memory, etc., is commonly used to control brushless DC motors. The controller controls a pulse width modulator (PWM) which in turn controls the speed and operation of the motor by modulating the pulse width signals which drive power inverters.

The inverter portion typically includes three half-bridge sections, each corresponding to a respective motor power phase. Rectifiers are also provided to prevent damage to the transistors during dead time intervals in which an inverter is driving neither high nor low.

In operation, the PWM provides output signals whose duty cycle at particular points in time is proportional to the magnitude of the voltage applied to the motor. When changing between the pull up transistor and the pull down transistor, the transistors are changed between conductive and non-conductive states, and there is a short period of time during which neither transistor is conductive. This period, known as the "dead time interval", and whose effect is shown by the non-sinusoidal lines at the zero crossing of two phase prior art motor currents in FIG. 1, is necessary to avoid the pull up and pull down transistors both being conductive at the same time which could cause damaging shoot-through currents.

As this "dead time interval", distortion effect occurs each time the sinusoidal current crosses zero, a nonlinear distortion, shown in FIG. 1, appears in the sinusoidal current that disrupts the sinusoidal nature of the applied current and causes non-smooth torque to be produced.

Various techniques had been proposed for correcting this distortion error, such as by using an off-set in the PWM output signal as a function of the out-put current polarity, a current sensing technique, and a current sensing technique which compensates for signal distortion using analog techniques.

U.S. Pat. No. 5,764,024 discloses another "dead time distortion" correction circuit. However, this circuit used hardware voltage sensing thereby requiring several additional components in the circuit to detect a zero-crossing event, which add to the cost of the motor controller.

Thus, it would be desirable to provide a zero-crossing correction method and apparatus for use in sinusoidally commutated motors which can be implemented at a lower cost than previously devised zero-crossing correction techniques.

SUMMARY

The present invention is an apparatus and method for driving an inductive load which provides zero-crossing correction for sinusoidal current generation through the load.

In one aspect, the present invention is an apparatus for driving an inductive load, such as a sinusoidally commutated motor. The apparatus includes a full H-bridge including a first pair of switches connected in a first polarity between a voltage supply, the inductive load, and ground, respectively, and a second pair of switches connected in a second opposed polarity between the voltage supply, the inductive load, and ground, control means for generating a first PWM signal and a first current cycle direction and a second PWM signal and a second current cycle direction to the first and second pair of switches, respectively, means for establishing a threshold, such as a voltage threshold, as a percentage of the full voltage supplied to the load and, in response to the magnitude of the voltage to be applied to the load, the control means applying the first and second PWM signals to the load when the applied voltage is greater than the threshold and generating and applying an adjusted voltage to the load when the applied voltage is less than or equal to the threshold.

In another aspect, the present invention is a method for driving an inductive load which comprises the steps of:

providing a full H-bridge including a first pair of switches connected in a first polarity between a voltage supply, the inductive load, and ground and a second pair of switches connected between the voltage supply, the inductive load, and ground;

generating a first PWM signal and a first current cycle direction and a second PWM signal and a second current cycle direction to the first and second pairs of switches, respectively, establishing a threshold, and in response to the magnitude of the voltage to be applied to the load, applying the first and second PWM signals to the load when the applied voltage is greater than the threshold and generating and applying an adjusted voltage to the load when the applied voltage is less than or equal to the threshold.

The present invention provides a zero crossing distortion correction method and apparatus which can be implemented at a low cost than previously devised zero crossing distortion correction techniques.

BRIEF DESCRIPTION OF THE DRAWING

The various features, advantages, and other uses of the present invention will become more apparent by referring to the following detailed description and drawing in which.

DETAILED DESCRIPTION

The following description of the inventive zero-crossing correction for sinusoidal currents is intended for use with any inductive load which requires smooth sinusoidal current, particularly at zero-crossing of the inductive load current, for smooth torque production. Thus, although the present invention will be described in use with a brushless, permanent magnet, DC motor having one or more phases, it will be understood that the present invention is equally applicable to other types of inductive loads which require zero-crossing correction for smooth current generation.

Figure 1:
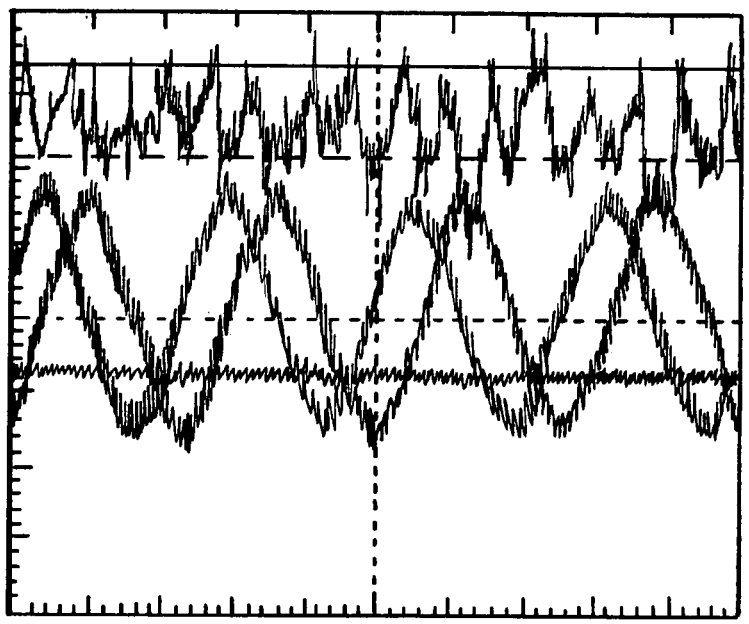
FIG. 1 is a two phase current waveform of a prior art, two phase motor with dead time distortion.
Figure 2:
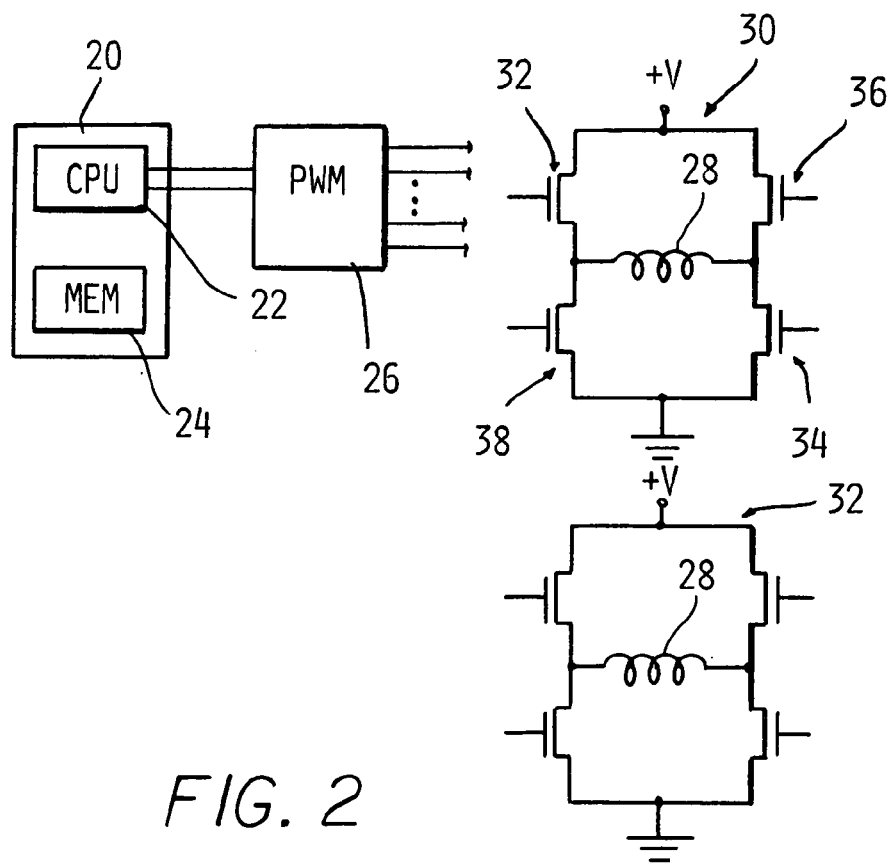
FIG. 2 is a block and schematic diagram of a inductive load control implementing zero-crossing correction according to the present invention.

As shown in FIG. 2, the present invention utilizes a control means 20, such as a microcontroller containing a central processing unit 22 executing a control program stored in a memory 24. The CPU 22 outputs control signals to a pulse width modulator (PWM) 26.

The PWM 26 generates output signals in the form of pulse width modulated signals to power switches arranged to supply one or more phases or electric current to an inductive load 28. A power switch circuit 30, 32 for two phases is shown by way of example only in FIG. 2. It will be understood that the present invention is equally applicable one to N phases with similar power switch configurations for each phase.

Thus, first phase power switch circuit 30 is a full H bridge containing power electronic switches, typically FETs. The power switches are arranged in pairs, such as a first pair of power switches 32 and 34, and a second pair of power switches 36 and 38 across the inductive load 28 between the supply voltage +V and ground. Each of the switches 32, 34, 36, and 38 is independently controlled by the PWM 26. The PWM 26 functions to control the voltage across the inductive load or motor 28. This enables the current in each motor phase bridge circuit 30 and 32, for example, and, thus, the motor torque, to be controlled.

The present invention makes use of a switching method wherein the controller 20 changes from a so-called "soft-switching" to a "hard-switching" of the H-bridges 30, 32, etc., depending upon the motor phase voltage magnitude with respect to a preset or known voltage threshold.

Figure 3A:
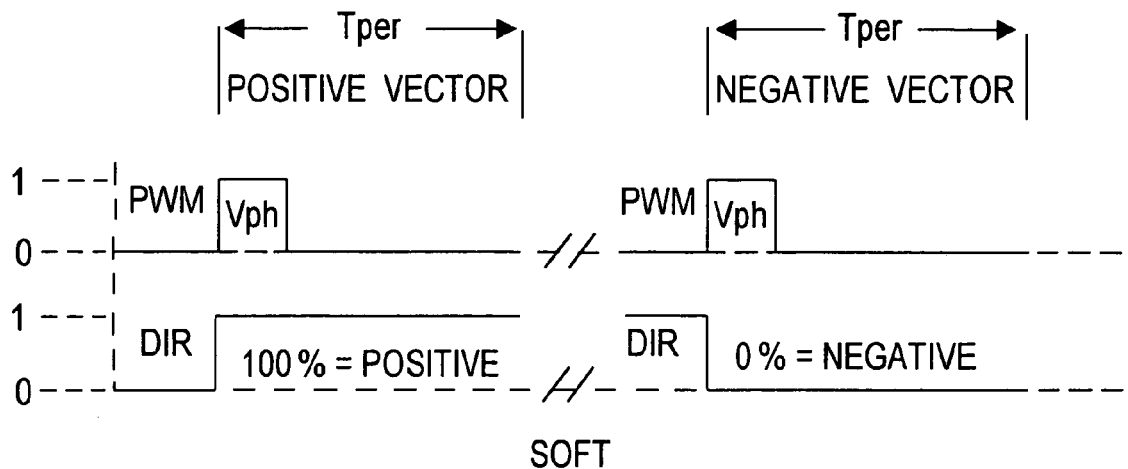
FIGS. 3A, 3B and 3C are waveform diagrams showing the three switching modes of the present invention.

In the "soft-switching" method, the lower switch of one side of the H-bridge, for each switch pair, such as switches 34 and 38, is held in a "on" or conductive state for a full 180° for each half cycle of the voltage cycle, and the opposite leg of each switch pair in the H-bridges 30, 32, etc., is controlled by complementary PWM signals, with the "on" time of the upper switch 32 or 36 of each switch pair being proportional to the total voltage applied across each phase. Thus, as shown in FIG. 3A, for each positive and negative vector or half cycle of the voltage applied to the load 28, a direction signal indicative of a positive or negative vector is generated by the CPU22. The CPU 22 outputs signals to the PWM 26 which generates a pulse width modulated voltage signal proportional to the applied voltage.

Since the "soft-switching" method is employed for motor voltages above the preset voltage threshold, such voltages and the torque produced thereby by the inductive load 28 will be much larger than any zero-crossing such that any distortion in the motor current at the zero-crossing of the current is small in comparison and is essentially undetectable Since the CPU 22 issues commands to the PWM 26 to generate a specific voltage across the load 28, the CPU 22 knows the magnitude of the required voltage. Thus, the CPU 22, for voltages to be applied to the load 28 equal to or below the preset threshold, will issue commands to the PWM 26 to implement a "hard-switching" method of the H-bridges 28, 32, etc.

Figure 3B:
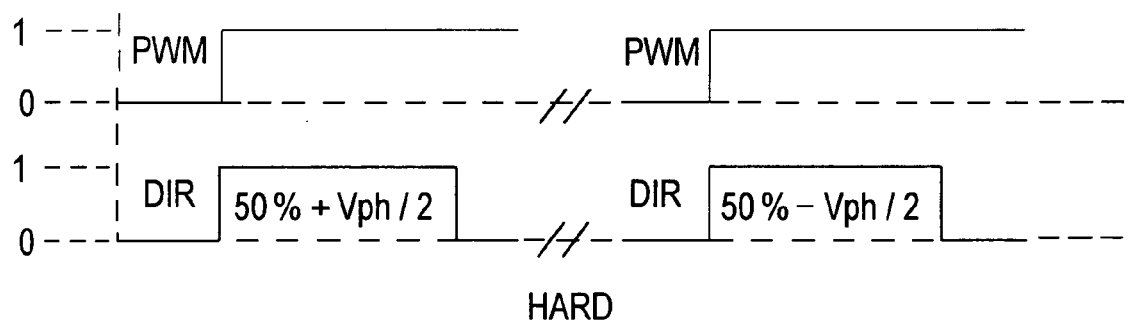

As shown in FIG. 3B, the opposite pairs of switches 32 and 34 or 36 and 38 are turned on within the same PWM cycle. For this switching method, opposite pairs of switches are on for 50% of the period to produce a net zero current. By shifting the bias above or below 50%, a small voltage is generated across the phase, thus influencing a small change in current. Because the current in an inductor cannot change instantaneously, the Kirchov equations for the phase circuit are different for each pair of switches, and are determined by the direction of current and the sign of the voltage applied by the switches. In FIG. 3B, the current in the phase is flowing from the +V bus, through switch 32, through load phase 28, and through switch 34 to ground. This is the circuit when the voltage is applied with the direction of current flow.

However, when switches 32 and 34 are turned off, and switches 36 and 38 are turned on, the current in the load phase 28 is still flowing in the same direction. For this case, the current is flowing from ground through switch 38, through the load phase 28, through switch 36, and into the +V bus. It is clear to see that the current path when the voltage is with the current, is different when the voltage is applied against the direction of current flow. As a result, if the switch pair 32, 34 are held on for the same amount of time as 36, 38, the net current in the phase will be non-zero.

Figure 4:
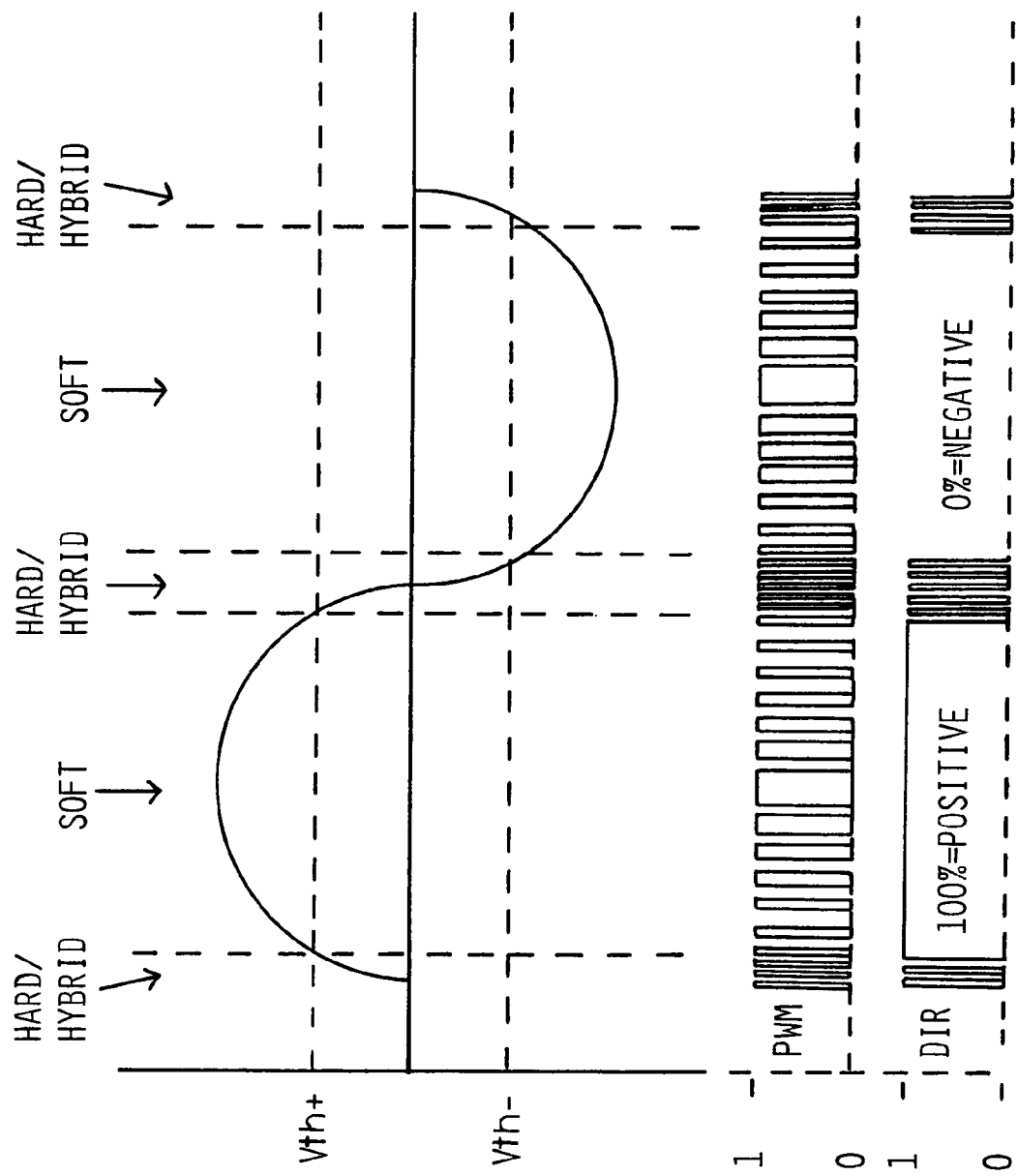
FIG. 4 is a graph depicting zero-crossing correction according to the present invention.

An additional deadtime correction factor equal to about twice the deadtime, for example, is added to the desired on-time value centered at 50% of the PWM period. This correction allows the applied inverter voltages to produce a smooth zero-crossing as shown in FIG. 4.

The present invention also provides a "hybrid-switching" method and apparatus which provides a settling or adjustment time to allow measurement or sensing of a motor parameter, such as motor current, while using less expensive circuit components having slow response times.

Figure 3C:
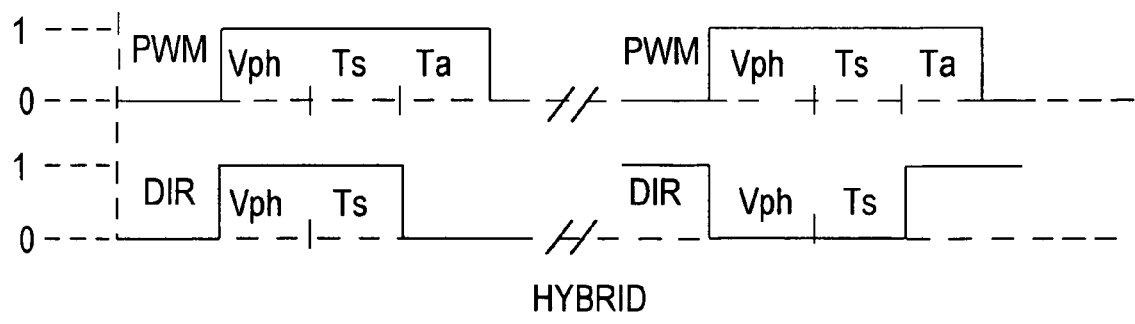

The "hybrid-switching" method is a modification of the hard switching method described above. As shown in FIG. 3C, the PWM period for each half voltage cycle is the sum or accumulation of the desired voltage (Vph) to be applied to the motor phase normalized to a range of 0% to 100% of the full bridge voltage to be applied during 1 PWM period, the settling time (Ts) of any sense circuitry normalized to a percentage of the total PWM period, and an adjustment time (Ta) used to balance or negate the extra "on" time required for sensing of motor parameters, such as phase current. The directional signal supplied by the CPU 22 also includes a settling time (Ts) component.

The adjustment time Ta, does not need to be as long as the settling time, Ts. The actual ratio could be about 0.6 to about 0.9. This ratio may also function as the correction factor of the present invention.

The threshold for switching between soft and hard switching can also be calculated by the relative duty-cycle setting of Vph, where:

Vph is the PWM voltage to be applied to the load phase;
Vbatt is the voltage on the bus;
Tper is the PWM period; and
Ts is the settling time for motor parameter sense circuits.

For Vph/Vbatt*Tper<Ts (the settling time of any sense circuitry) use hard/hybrid switching.

For Vph/Vbatt*Tper>Ts (the settling time of any sense circuitry) use soft switching.

For example, if the Tper=50 uS, and Ts+5 uS, then when the Vph duty-cycle is less than 10%, hybrid switching should be used so the total adjusted PWM duty cycle should be:

$$Vph\ (PWM) = Vph/Vbus + 0.1 + 0.0825$$

$$Direction\ (PWM) = Vph/Vbus + 0.1$$

Alternately, the threshold for switching between soft and hard switching or between soft and hybrid switching can be set as the percentage of the full scale voltage applied to the load. For example, a threshold of 3.5% of the full load voltage can be used as the threshold.

An example of peak to peak and RMS currents using full hard switching according to the present invention is depicted. The real phase current is shown by waveform 80. Waveform 82 represents the direction signal and waveform 84 PWM signal.

Figure 5:
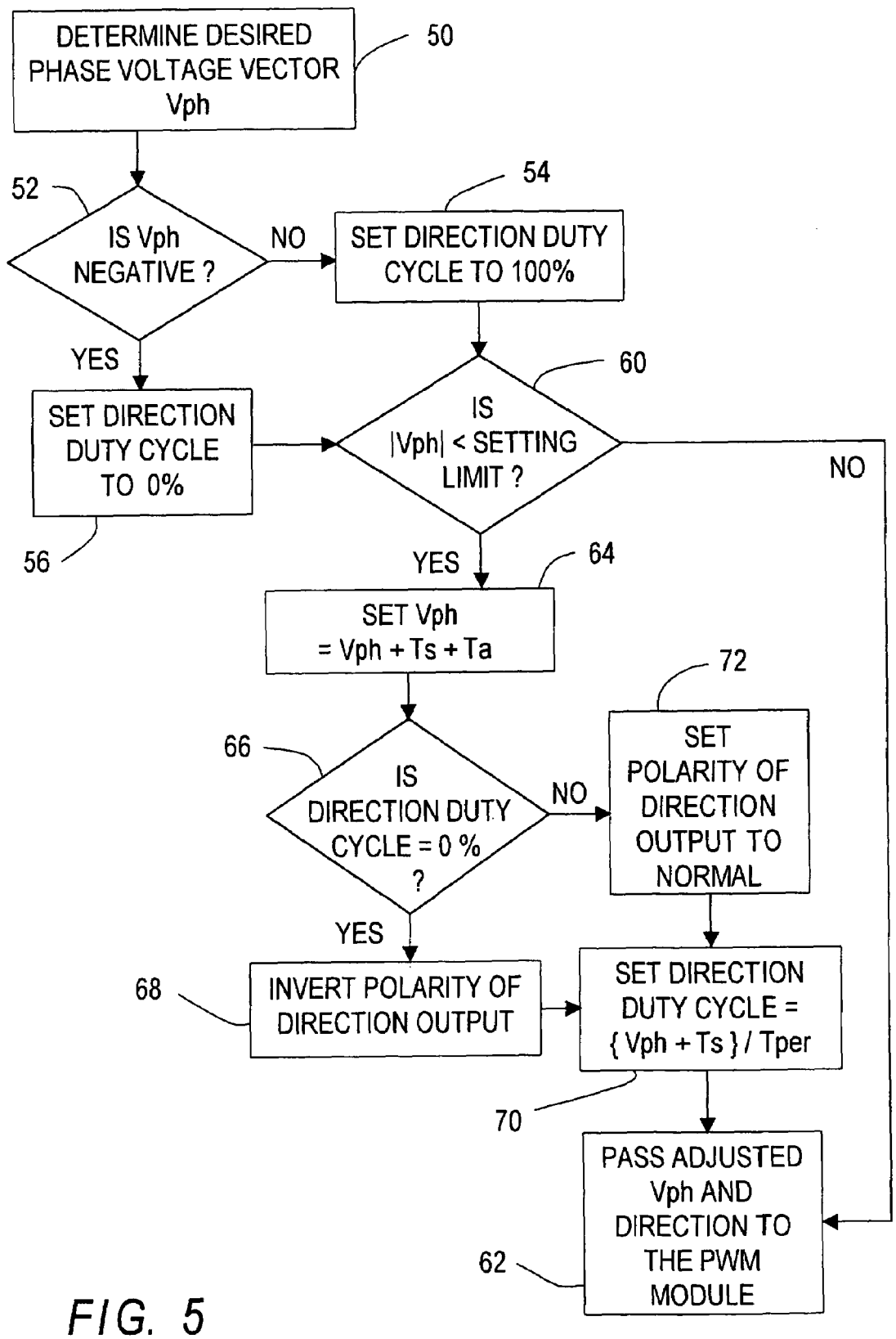
FIG. 5 is a flow diagram depicting the sequence of operation of the control of the present invention and implementing zero-crossing correction.
Figure 6:
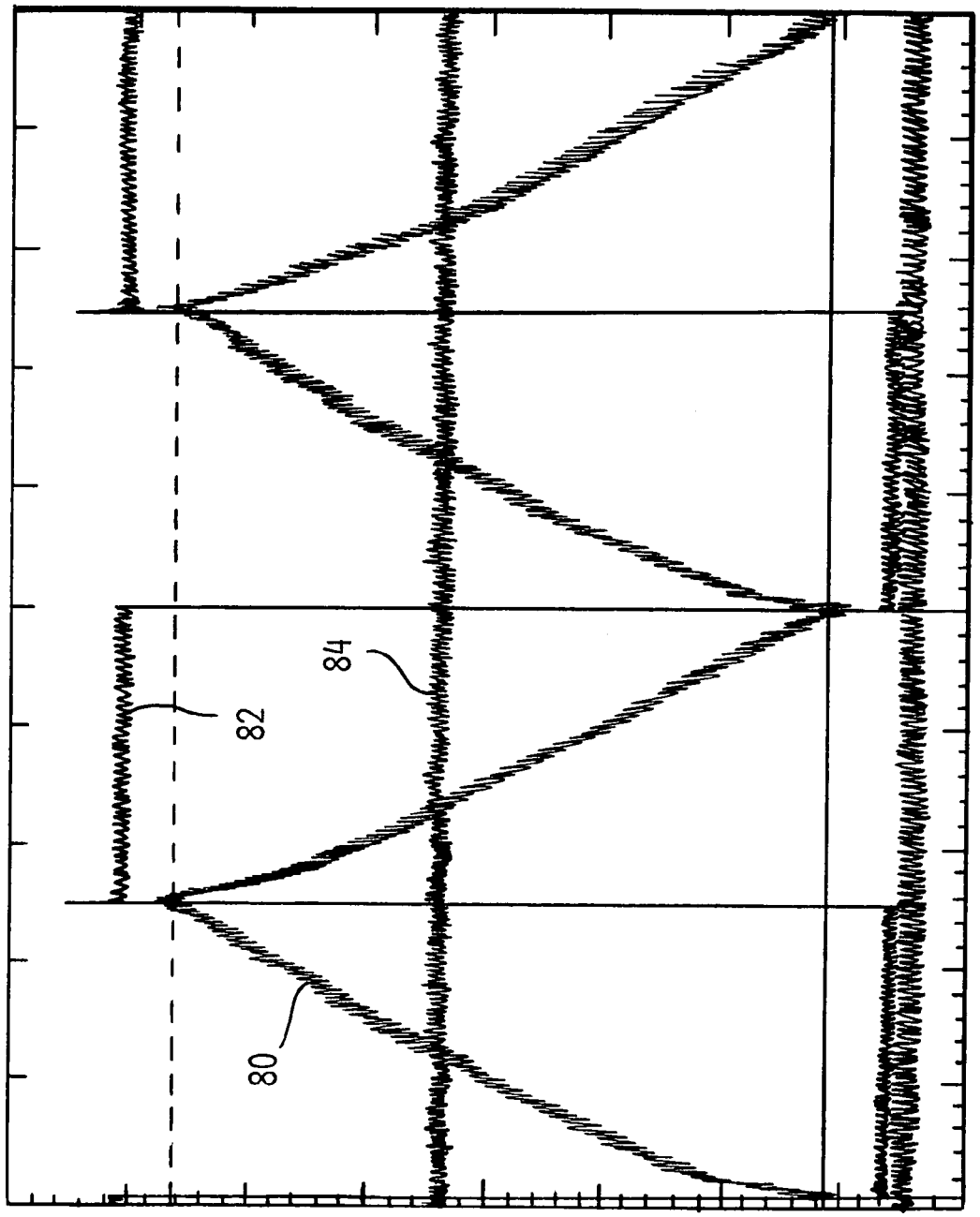
FIG. 6 is a graph showing peak to peak and RMS current measurement using full hard switching according to the present invention.

Referring to FIG. 5, there is depicted a flow diagram of a control program or method executed by the CPU 22 in selecting between the "soft-switching" or "hybrid-switching" PWM control methods described above. It will be understood that the "hard-switching" method described above and shown in FIG. 3B can be implemented instead of the "hybrid-switching" method in the flow diagram of FIG. 5.

In step 50, the CPU 22 determines the desired phase voltage vector (voltage magnitude and positive or negative direction) to be applied to the load 28. The CPU 22 then determines in step 52 if the phase voltage (Vph) vector is positive.

If the Vph vector is negative or not positive, the CPU 22 in step 54 sets the direction duty cycle to 100%. Conversely, if the Vph is positive, the CPU 22 in step 56 sets the direction duty cycle to 0%, as shown in FIG. 3C.

Next, the CPU 22 determines in step 60 whether the phase voltage vector (Vph) is less than the threshold or settling limit. If not, the CPU 22 in step 62 passes the adjusted Vph and direction signals to the PWM 26.

If the CPU 22 determines that the phase voltage vector (Vph) is less than the settling limit, for a "hybrid-switching" scheme, the CPU 22, in step 64, sets Vph equal to Vph plus the settling time (Ts) and an adjustment time factor (Ta) as described above.

The CPU 64 then checks the whether the direction duty cycle is equal to zero in step 66, as set in step 56. If the direction duty cycle is equal to 0%, the CPU 22 in step 68 inverts the polarity of the direction output and, in step 70, sets the direction duty cycle equal to Vph plus the settling time factor (Ts) divided by the (Tper) which is equal to the PWM period, typically 50 microseconds (20 kHz in automotive applications). When executing step 66, if the CPU 22 determines that the direction duty cycle is not equal to or greater than 0%, the CPU 22 sets the polarity of the direction output to normal in step 72. The CPU 22 then executes step 70 described above. Next, the CPU 22 passes the adjusted Vph and direction signals to the PWM 26 in step 62 for generation of the adjusted PWM voltage signals to the H-bridge circuit 30, 32, etc.

Figure 7:
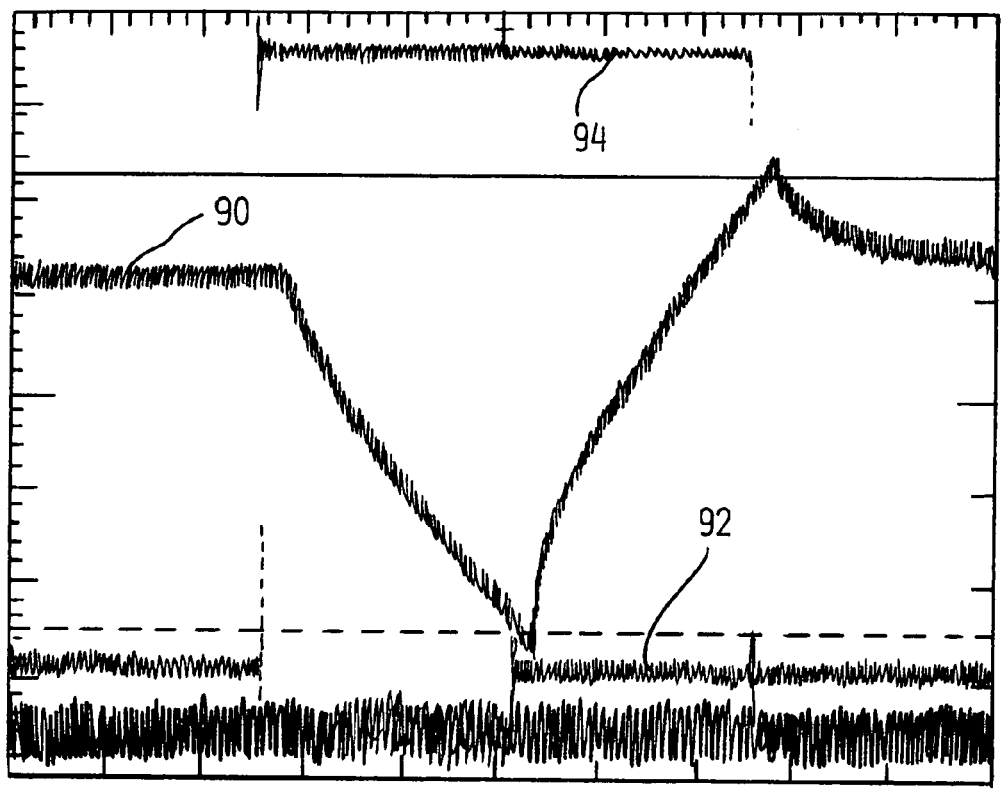
FIG. 7 is a graph showing peak to peak current measurement using hybrid switching according to the present invention.
Figure 8:
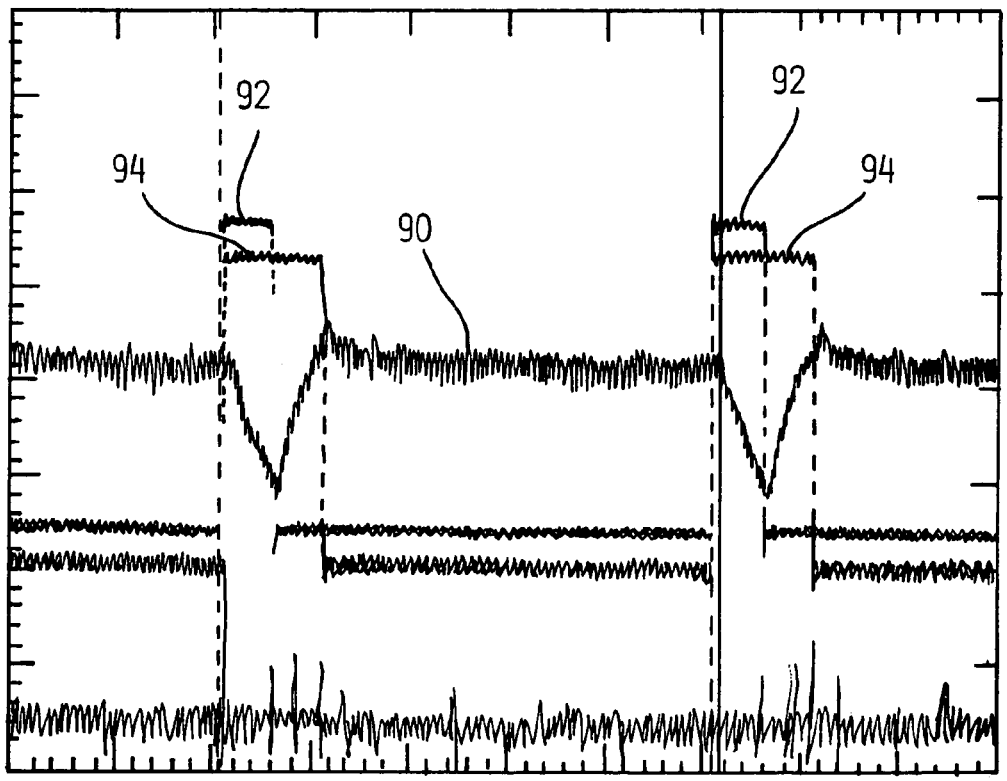
FIG. 8 is a graph depicting an RMS current measurement using hybrid switching according to the present invention.

FIGS. 7 and 8 depict peak to peak and RMS currents using hybrid switching according to the present invention. FIG. 7 is an enlargement of a portion of FIG. 8. In both FIGS. 7 and 8, waveform 90 represents the real phase of current, waveforms 92 the direction signal and waveforms 94, the PWM signals.

What is claimed is:

1. An apparatus for driving an inductive load comprising:
   a full H-bridge including a first pair of switches connected in a first polarity between a voltage supply, the inductive load, and ground, respectively, and a second pair of switches connected in a second opposed polarity between the voltage supply, the inductive load, and ground;
   control means for generating a first PWM signal and a first current cycle direction and a second PWM signal and a second current cycle direction to the first and second pair of switches, respectively;
   means for establishing a threshold as a percentage of a full voltage supplied to the load; and
   in response to the magnitude of the voltage to be applied to the load, the control means applying the first and second PWM signals to the load when the applied voltage is greater than the threshold and generating and applying an adjusted voltage to the load when the applied voltage is less than or equal to the threshold.

2. The apparatus of claim 1 wherein:
   the means for applying the first and second PWM signals to the load applies the first and second PWM signals to the load when the voltage per load phase divided by the full supply voltage times the PWM period is less than a settling time.

3. The apparatus of claim 1 wherein the means for applying the adjusted voltage which includes applying an adjusted voltage equal to the full applied voltage plus the settling time plus an adjustment time.

4. The apparatus of claim 3 wherein:
   the adjustment time is about 0.6 to about 0.9 of the settling time.

5. The apparatus of claim 1 wherein the means for applying the adjusted voltage applies an adjusted voltage to the load for the time period equal to a 50% duty cycle plus 50% of a desired voltage applied to the load plus a deadtime correction factor.

6. The apparatus of claim 1 wherein:
   the threshold substantially equals a settling time of means for sensing a load parameter.

7. A method for driving an inductive load comprising the steps of:
   providing a full H-bridge including a first pair of switches connected in a first polarity between a voltage supply, the inductive load, and ground and a second pair of switches connected between the voltage supply, the inductive load, and ground;
   generating a first PWM signal and a first current cycle direction and a second PWM signal and a second current cycle direction to the first and second pairs of switches, respectively;
   establishing a threshold, and
   in response to the magnitude of the voltage to be applied to the load, applying the first and second PWM signals to the load when the applied voltage is greater than the threshold and generating and applying an adjusted voltage to the load when the applied voltage is less than or equal to the threshold.

8. The method of claim 1 wherein the step of applying the adjusted voltage comprises the step of:
   applying an adjusted voltage to the load for the time period equal to a 50% duty cycle plus 50% of a desired voltage applied to the load plus a deadtime correction factor.

9. The method of claim 7 wherein the step of applying an adjusted voltage to the load comprises the step of:
   applying an adjusted voltage equal to a full voltage to be applied to the load plus a settling time plus an adjustment time.

10. The method of claim 9 further comprising the step of:
    setting the adjustment time to about 0.6 to about 0.9 of the settling time.

11. The method of claim 7 wherein the step of establishing the threshold comprises the step of:
    establishing the threshold substantially equals to a settling time of means for sensing a load parameter.

12. The method of claim 7 wherein the step of applying the adjusted voltage comprises the step of:
    applying the first and second PWM signals to the load when the voltage per load phase divided by a full supply voltage times the PWM period is less than a settling time.

* * * * *